United States Patent [19]
Smitt

[11] Patent Number: 5,640,465
[45] Date of Patent: Jun. 17, 1997

[54] METHOD AND APPARATUS FOR ON-LINE TILED THRESHOLDING IN SCANNERS BASED ON PRESCAN

[76] Inventor: Asbjorn Smitt, Norde Strandvej 214, DK-3140 Aalsgaarde, Denmark

[21] Appl. No.: 566,489

[22] Filed: Dec. 4, 1995

Related U.S. Application Data

[63] Continuation of Ser. No. 124,355, Sep. 10, 1993, abandoned, which is a continuation of Ser. No. 835,771, Feb. 14, 1992, abandoned.

[51] Int. Cl.$^6$ .................................................. H04N 1/415
[52] U.S. Cl. .................... 382/172; 358/455; 358/433; 358/429; 358/465; 382/168; 348/254
[58] Field of Search ............................ 382/168, 172, 382/268, 270, 272, 274; 358/433, 429, 458, 455, 465, 466; 348/254

[56] References Cited

U.S. PATENT DOCUMENTS

| | | | |
|---|---|---|---|
| 3,919,464 | 11/1975 | Kondoh . | |
| 4,196,454 | 4/1980 | Warren | 382/52 |
| 4,238,768 | 12/1980 | Mitsuya et al. | 382/52 |
| 4,562,486 | 12/1985 | Suzuki et al. | 382/53 |
| 4,575,769 | 3/1986 | Arnoldi . | |
| 4,631,598 | 12/1986 | Burkhardt et al. . | |
| 4,710,822 | 12/1987 | Matsunawa | 382/51 |
| 4,823,194 | 4/1989 | Mishima et al. | 382/53 |
| 4,934,821 | 6/1990 | Morton . | |
| 5,043,827 | 8/1991 | Beikirch . | |
| 5,053,619 | 10/1991 | Arimoto . | |
| 5,086,486 | 2/1992 | Yamada | 382/50 |
| 5,117,295 | 5/1992 | Smitt . | |
| 5,133,022 | 7/1992 | Weideman | 382/51 |
| 5,179,599 | 1/1993 | Formanek | 382/51 |
| 5,218,457 | 6/1993 | Burkhardt et al. . | |
| 5,303,064 | 4/1994 | Johnson et al. . | |
| 5,321,529 | 6/1994 | Funada . | |
| 5,377,020 | 12/1994 | Smitt . | |
| 5,402,234 | 3/1995 | Deck . | |
| 5,442,465 | 8/1995 | Compton . | |
| 5,452,109 | 9/1995 | Compton . | |
| 5,502,578 | 3/1996 | Smitt . | |

OTHER PUBLICATIONS

K. Douglas Gennetten and Michael J. Steinle, "Designing a Scanner with Color Vision", Hewlett–Packard Journal, Aug., 1993, pp. 52–58.

*Primary Examiner*—Wellington Chin
*Assistant Examiner*—Jean B. Corrielus
*Attorney, Agent, or Firm*—Gustavo Siller, Jr.; Meredith L. Martin

[57] ABSTRACT

A scanner system comprises an optical line detector for linewise, optical scanning of an original for generating a data signal in response to the grey-level received by the detector from points along a respective line. The points are sorted with associated grey-level values in groups in response to their positional origin on the original. The individual threshold values for the grey-level values are determined statistically for a plurality of zones on the original in response to the frequency of respective grey-level values in the respective zone. The threshold values of respective zones are stored in a store. The original is re-entered by linewise, optical scanning, and the data signal generated by the scanning and representing grey-levels in points along respective, entered lines is compared in a comparator with a threshold value calculated for the point concerned, and in response to this a binary, electric representation of the original is generated.

9 Claims, 3 Drawing Sheets

METHOD AND APPARATUS FOR ON-LINE TILED THRESHOLDING IN SCANNERS BASED ON PRESCAN

This is a continuation of U.S. patent application Ser. No. 08/124,355, filed on Sep. 20, 1993, now abandoned, which is a continuation of U.S. patent application Ser. No. 07/835,774, filed on Feb. 14, 1992, now abandoned.

BACKGROUND OF THE INVENTION

The invention concerns scanning of originals, such as letters and drawings, where the information on the original is entered optically with a scanner. Subsequently an electric representation is generated for the entered original.

Scanners of this type are widely known. With respect to the quality of a reproduced image it is important that the electric representation of the data entered by the scanner is optimum with respect to resolution and reproduction of details. The entered data are usually grey-level data, a point on the original being represented by its grey-level. The entered grey-level data are preferably digital, and an 8-bit representation (256 grey-level values) usually gives a suitable tone resolution. When subsequently reproduced, the original is usually represented by a binary representation (black/white) for each pixel. A threshold value is therefore introduced so that the electric representation of the original is reduced to comprise just a binary representation in the form of two states for each image element. The threshold value is determined from a wish to maintain as much information as possible in the image, and the threshold value is usually determined statistically in response to the distribution of the grey-level values. U.S. Pat. No. 4,972,273 is an example of such a technique.

A large number of techniques for determining threshold values for scanners are known. In some techniques an operator enters a threshold value for an original based on experience. In other systems a threshold value is determined statistically for an original by a prescan of the original, the threshold value being used in the actual scanning in connection with the image processing procedure.

However, the fact is that an original for scanning frequently has an uneven distribution of dark and light areas. Thus, a threshold value determined for the entire original may frequently cause details to disappear when the threshold value is introduced.

It has thus been attempted to develop techniques for dividing the original into zones to determine threshold values for the individual zones. The information of the original is entered linewise so that it has been necessary to enter and store the original in its entirety and subsequently determine the threshold values statistically. This technique is vitiated by a very important drawback—viz. storage of large data amounts. In case of a large original in e.g. A0 format (36×44 inches) and with a resolution of 300 dots per inch, the stored data amount corresponds to about 143 Mbytes, since each pixel contains grey-level information corresponding to typically 8 bits. Thus, very large data amounts are to be processed merely to calculate the threshold value which is subsequently to be used for the actual data processing. Following this the individual pixels are to be compared with respective threshold values.

The object of the invention is to provide a method of scanning an original in a manner that allows for variations in the information across the surface of the original, without this requiring storage of large data amounts.

SUMMARY OF THE INVENTION

According to the invention the local threshold values are determined by scanning the original linewise by a prescan. The original is divided into zones, and the entered line is divided into line segments in response to the zone to which the pixel in a line segment belong. The original may e.g. be divided into 16×16 zones, and each zone comprises about 550,000 pixels in the above example. The scanner contains a central control unit which may be adapted to establish a plurality of separate threshold value calculating units corresponding to the number of zones transversely to the original. The line segments are passed to respective threshold value calculating units, and the frequencies of the individual grey-levels are determined. The frequency of the grey-levels may then be used for determining a threshold value for respective zones. This threshold value determination may thus be performed without large data amounts having to be stored, since the frequency is merely registered. This can be done since the lines, in connection with the threshold value determination, are divided and sorted in line segments in response to the zones to which the pixel of a line segment in question belong. When the threshold value of a zone is determined, the value is applied to a storage means (e.g. a RAM store), in which the value is stored while the threshold value calculating unit concerned is reset. Then the threshold value calculation is repeated for the next row of zones transversely to the original until the threshold values of all zones of the original have been determined and stored in the storage means.

When the original is subsequently scanned linewise, each individual pixel is compared with its respective threshold value in response to the zone to which the pixel belongs. The threshold value is read out from the storage means in response to the line number and position of the pixel concerned in the line. This provides on-line tiled thresholding.

BRIEF DESCRIPTION OF THE DRAWINGS

The invention will be explained more fully below in connection with a preferred embodiment and with reference to the drawings, in which FIG. 1 schematically shows the parts relevant to the invention in a scanner according to the invention, FIG. 2 schematically shows the zone division on an original according to the invention, FIG. 3 schematically shows an embodiment of a circuit for determining the threshold values of the individual zones according to the invention.

DETAILED DESCRIPTION OF THE PRESENTLY PREFERRED EMBODIMENTS

Figure 1:
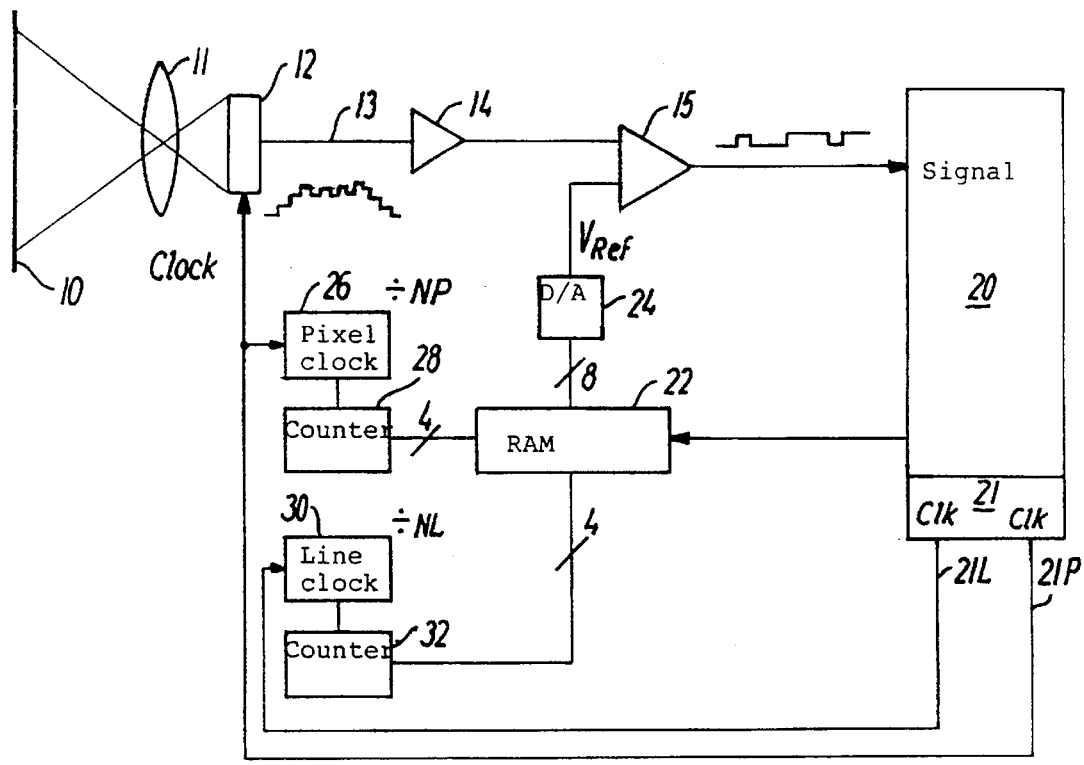

FIG. 1 shows the parts of a scanner relevant to the invention. A drive for the original 10 moves it past a line detector 12, preferably in the form of a CCD camera. The original 10 is illuminated with a light source (not shown) and reflects the light which, via a lens 11 in the form of a lens beam or the like, is collected with the line detector 12. Neither the drive nor the light source is shown, since these elements are well-known and have no importance for the understanding of the inventive principle.

The contents of the cells of the line detector 12 are clocked out periodically as the original is moved by. If the line detector is adapted to collect light from a line transversely to the original 10 of A0 format, it will contain a little less than 11,000 light sensitive cells with 300 dots per inch (dpi). The line detector 12 is therefore composed of several independent CCD cameras, e.g. as stated in the U.S. patent application Ser. No. 07/434,456, now U.S. Pat. No. 5,117,295.

The information collected by the line detector 12 is clocked out on a line 13 in serial form, the collected amount of light energy in a cell being represented by a signal amplitude related thereto. This signal is amplified in an amplifier 14 and is passed to a thresholding device or comparator 15, where the signal amplitude is compared with a predetermined threshold value in the form of a reference voltage. If the signal amplitude is greater than the reference voltage $V_{ref}$, a binary one is generated on the output of the comparator 15, while a binary zero is generated if the signal amplitude is below the reference voltage $V_{ref}$. The output of the comparator 15 applies a digital signal which is transmitted to a central control unit 20 that receives the signal and either stores it in a store (not shown) or passes it further on for further image processing or the like.

The control unit 20 moreover contains a time control unit 21 which partly clocks out data from the line detector 12, partly controls the threshold value with which data are compared. In addition, the time control unit is connected to the drive, which is not shown since this is well-known to a skilled person. A RAM store 22 contains a number of threshold values, stored by the control unit 20, for respective zones on the original 10. In a preferred embodiment the digital threshold values are stored in the form of digital 8-bit words, which are read out when their addresses are pointed out by threshold value control units. A threshold value word is read out and passed as 8 parallel bits to a digital-to-analog converter 24, thereby creating a voltage which is applied as the reference voltage input of the comparator 15. The RAM store maintains its output signal until another threshold value is pointed out by the threshold value control units.

The threshold value control units are controlled by the time control unit 21 of the control unit 20 via its clock output. The respective addresses of the RAM store 22 are directly related to a zone on the original, so that addressing can be performed with two counters coupled to a pixel clock line 21P and a line clock line 21L. The clock signal on the pixel clock line 21P is passed to a divider unit 26 where the signal frequency is divided by a figure NP, which may either be predetermined or be controlled by the control unit 20 in response to the size of the original. In case of an original in AO format and with 300 dpi there will be 10,800 pixels transversely to the original. Therefore, in case of 16 zones, NP will be around 675. NP preferably ranges between 100 and 1,000, but other values may also be useful. The divider unit 26 applies a clock signal to a counter 28, which is adapted to count to a number corresponding to the plurality of zones in the transverse direction of the original, e.g. 16. Status of the counter 28 is applied to the RAM store via an output with 4 parallel lines. Thus, the counter 28 informs the RAM store 22 of the position of the zone in the transverse direction of the original. When the last pixel value in a line has been entered, the counter 28 is reset in a known manner, which will not be mentioned further.

In addition, the time control unit 21 applies a line clock signal via a line 21L, the clock pulses having been synchronized with the entry of the lines in the line detector 12. A divider unit 30 divides the line clock frequency by a number N, which is of the same order as NP and is selected in the same manner. In case of an original in AO format NL will be 825. It is the number of zones which determines the size of NP and NL. The frequency divided clock signal is passed from the divider unit 30 to a counter 32 which, like the counter 28, is connected to the RAM store via an input with four parallel lines. Thus, the counter 32 informs the RAM store 32 of the position of the zone in the feed direction of the original.

The actual scanning procedure has been described above, and it will be seen from FIG. 1 that the RAM store 22 additionally has a data input where threshold value data are received together with the address information. The control unit 20 controls this data transfer.

The actual threshold values for each of the zones are determined during prescan, i.e. the original is caused to pass the line detector 12 two times. Alternatively, the scanner may have two line detectors so that the threshold values are determined by the first, while the original is entered by the second.

Figure 2:
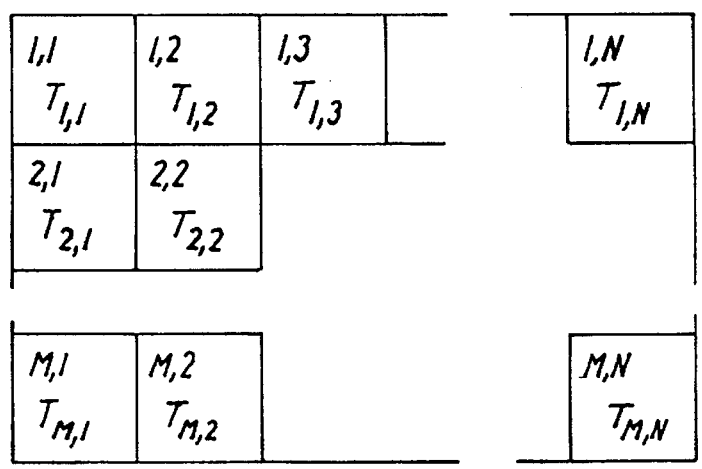

The threshold introduction of the scanned original is performed by dividing the original into a plurality of preferably rectangular zones. FIG. 2 shows an example of the zone division, each zone being designated by its row number and column number. As will be seen, there are M rows and N columns in the illustrated embodiment, the embodiment shown in FIG. 1 having been explained for N=M=16. A threshold value $T_{1,1} \ldots T_{M,N}$, stored in the RAM store 22 (FIG. 1), is determined for each zone.

Figure 3:
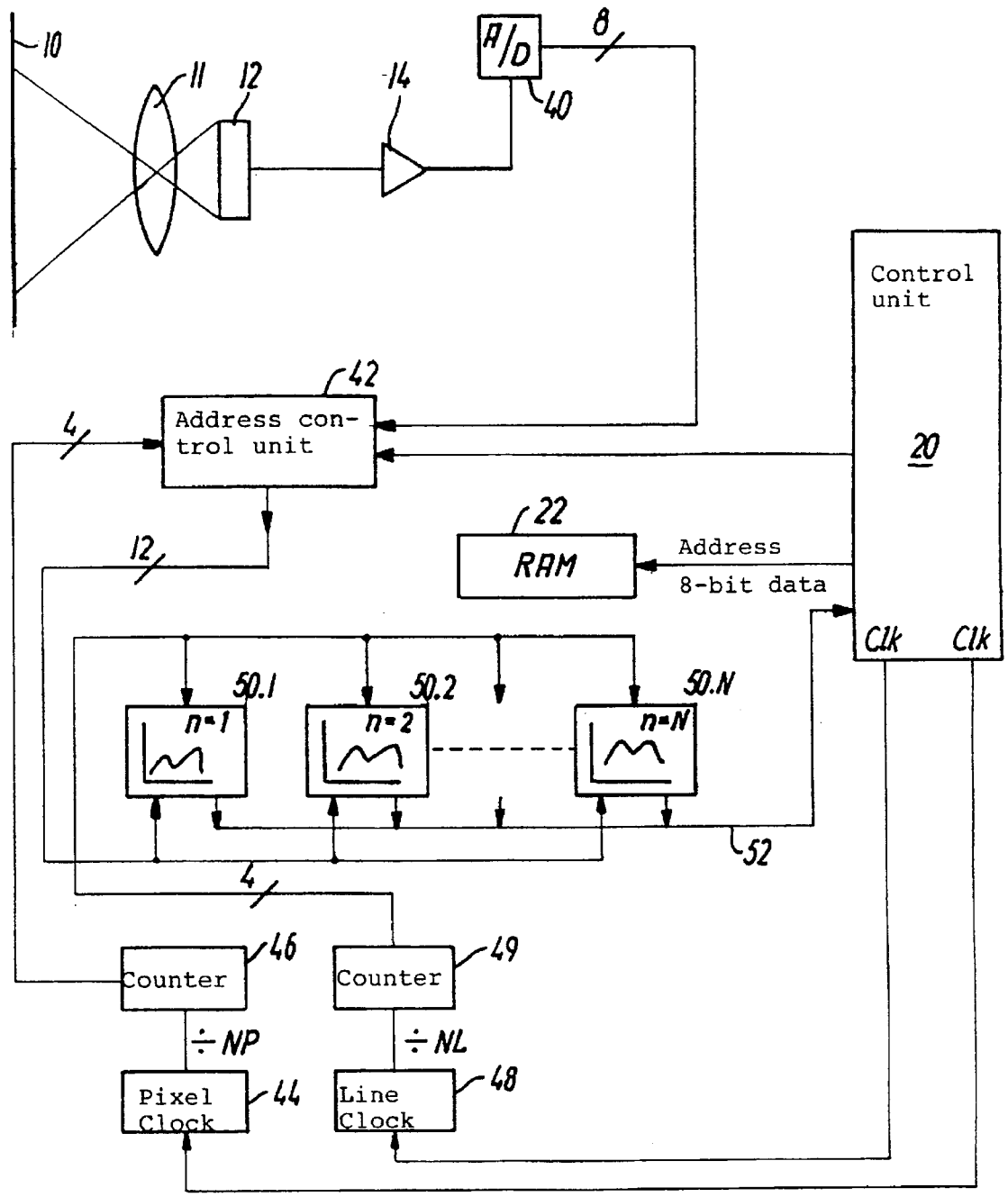

FIG. 3 illustrates how the individual threshold values can be collected. An original 10 is imaged via a lens element 11 on a line detector 12, which generates an electric signal in response to the information along a line transversely to the original 10. This electric signal is clocked out (not shown) and amplified in an amplifier 14, and during the prescan it is then passed to a threshold value determination circuit, said electric signal being first passed to an analog-to-digital converter 40 forming an 8-bit signal in the shown embodiment which represents the grey-level signal received on the input. This electric parallel representation of the signal is passed to an address control unit 42, which divides the signal line into segments and provides each segment with an address so that it can be transmitted further in response to the zone to which the segment belongs. In addition to the data input, the address control unit 42 also has a control unit connected to the control unit 20, from which it receives information on the actual prescan, including the number of zones or an indication that all grey-level values are to be included in the threshold value determination, it being sufficient in some connections to use every second or every fourth value. The control unit 20 applies a pixel clock signal to a divider unit 44, which divides the clock frequency by a number NP, the divided clock signal being passed to a counter 46. The divisor NP of the divider unit 44 may advantageously be controlled (not shown) by the control unit 20. The same applies to the divisor NL of the divider unit 48. The output signal of the counter 46 is passed to the address control unit 42, from which it is combined with the digitized grey-level data and is applied on the output. The signal is passed from there to N parallel threshold value determination units 50.1–50.N.

Each of the threshold value determination units 50.1–50.N receives data from the control unit 42 in response to the addresses. Data transfer is performed e.g. as shown with 12 parallel lines, four of which being used for addressing, while the last eight are used for data. Grey-level data are stored in the threshold value calculation units 50.1–50.N, which contain store cells for each grey-level value, e.g. 256, or for each range, e.g. containing four adjacent grey-levels, so that there will be 64 store cells.

The control unit applies a line clock signal to a divider unit 48 which divides the clock frequency by NL, the divided clock signal being then passed to a counter 49. The output signal from the counter 49 is passed to the threshold value calculation units 50.1–50.N to indicate the row to which the zones, whose threshold values are being calculated, belong. At the same time a shift in the status of the counter 49 marks that data entry for the zone in question has been terminated, and that the statistical calculation of the threshold values may be initiated. The threshold values may be determined e.g. by the entropy of the histogram shown in FIG. 4. It should be noted that in practice FIG. 4 will have discrete function levels for the individual grey-levels. It is possible here to use e.g. the technique described by Kapur et al. in the article "A new Method for Gray-Level Picture Thresholding Using the Entropy of the Histogram", Computer Vision, Graphics and Image Processing 29, p. 273–285 (Academic Press. Inc. 1985). Then the calculated threshold value is transferred to a common connection 52 from the threshold value calculation unit 50.1–50.N in the form of 8-bit data with address information for each threshold value. The control unit 20 receives these data and passes them on to the RAM store 22, as described above. The store cells in the threshold value calculation units 50.1–50.N are reset in connection with each zone shift, and the procedure is repeated for the next row of zones.

Figure 4:
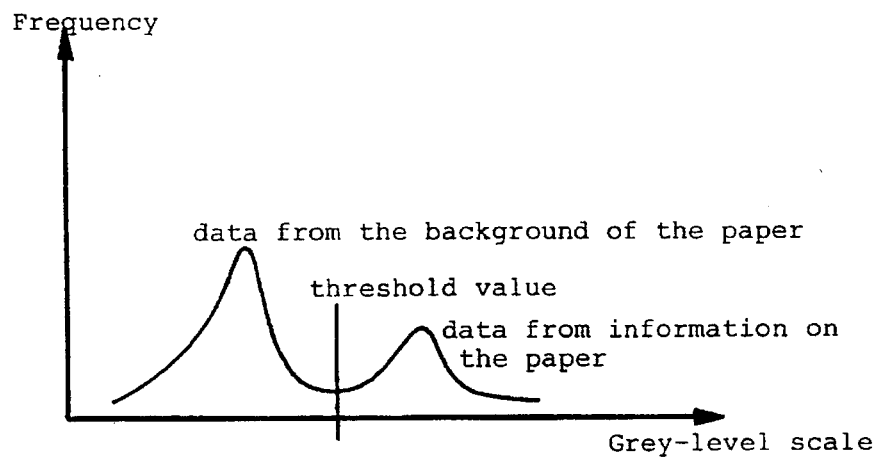
FIG. 4 is a diagram showing the frequency of the individual grey-levels.

FIG. 4 shows an example of the distribution of the grey-level values, from which it will be seen that the curve has two maxima—a peak from white pixels overlaid by noise and another peak which is caused by dark pixels likewise overlaid by noise. The threshold value can be introduced in many different ways, but the use of histogram entropy is currently preferred.

Figure 5:
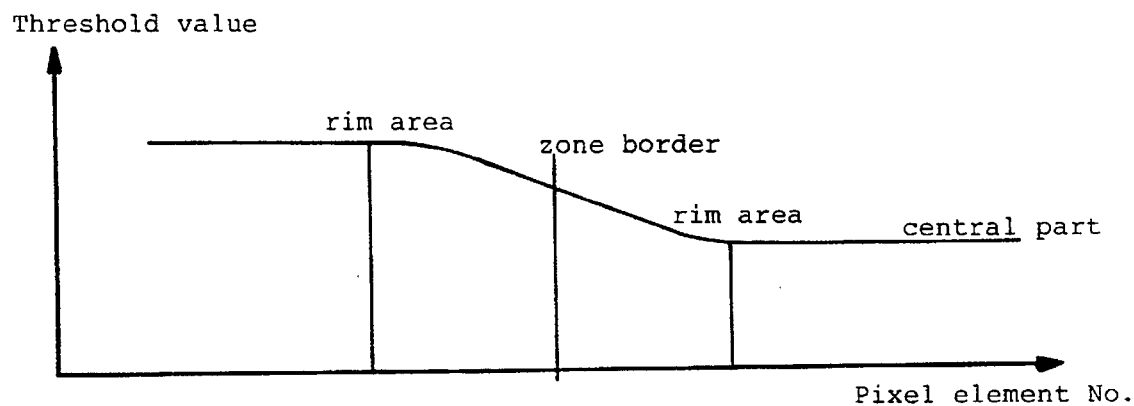
FIG. 5 shows an expedient adaptation of the threshold values in the rim area between two zones.

It is clear that the threshold values $T_{1,1} \ldots T_{M,N}$ will vary somewhat, so that markings may occur in the rim areas between the individual zones, showing the border between two adjacent zones, if a soft transition between the zones is not created. This can be done in practice in a manner known per se, the threshold values for pixels in the rim areas between two zones being weighted in response to the distance to the zone border or the distance to the center of the two zones. This weighting technique will be well-known to a skilled person and will therefore not be described further. The effect of this weighting is shown in FIG. 5, the threshold value being shown as a function of the pixel number. The threshold value is fixed as the threshold value of the zone in the central parts of the zone, while the threshold value is changed in the rim areas so that the actual threshold value converges toward the threshold value of the adjacent zone the closer the pixel concerned is to the center of the adjacent zone. At the zone border the actual threshold value will be the average value of the threshold values of the two zones. It will be trivial to a skilled person to build such a circuit, since the two threshold values can be obtained from the RAM store 22, the weighting function can be programmed on the basis of prior art, while the pixel position can be determined by a counter in response to the pixel clock signal 21P. The calculated value is passed to digital-to-analog converters 24. Similar observations can be made if the pixel in question is positioned in a corner of a zone and must therefore be selected in response to the threshold values of four zones.

I claim:

1. A method of scanning data information from an original and converting said data information to a digital representation of the original, the method comprising the steps of:

(a) scanning the original by linewise, optical scanning to produce a data signal representing grey-level values of points along lines of the original;

(b) dividing the original into a plurality of zones, each zone in the plurality of zones including a plurality of pixels, each pixel in the plurality of pixels having a corresponding grey-level value determined from segments of the lines which have been optically scanned during scanning, said segments being positioned in a parallel side by side relationship;

(c) calculating for each zone a statistical distribution by registering a frequency of occurrence of the grey-level values received from the plurality of pixels during the scanning;

(d) determining a fixed threshold value for each zone in response to the statistical distribution of the grey-level values, said determination of the fixed threshold value starting prior to termination of the prescanning;

(e) storing the fixed threshold value of each zone;

(f) comparing a plurality of the grey-level values in one of the plurality of zones to the fixed threshold value of the one zone;

(g) generating binary values in response to said comparison; and (h) generating an electric representation of the original in response to the binary values.

2. The method according to claim 1 wherein determination of the fixed threshold value of each zone is made by prescanning the original.

3. The method according to claim 1 further comprising the step of corresponding one zone with the fixed threshold value for that zone such that each zone represents a rectangular area on the original which is divided into line segments disposed side by side.

4. The method according to claim 1 further comprising the step of comparing the grey-level values of the zone to a further threshold value of the zone when a first comparison point is positioned centrally in the zone, said further threshold value corresponding to an interpolation between the fixed threshold values of several adjacent zones when a second comparison point is positioned in a rim of the zone facing said adjacent zones.

5. A method of scanning an original comprising the steps of:

(a) scanning the original by linewise, optical scanning to provide a first data signal representing grey-level values of points along lines of the original;

(b) dividing the original into a plurality of zones, each zone in the plurality of zones comprising pixels from segments of the lines which have been optically scanned during scanning, said segments being positioned in a parallel side by side relationship;

(c) calculating for each zone a statistical distribution by registering a frequency of occurrence of the grey-level values received during the scanning;

(d) determining a fixed threshold value for each zone in response to the statistical distribution of the grey-level values, said determination of the fixed threshold value starting prior to the termination of the scanning;

(e) storing the fixed threshold value of each zone;

(f) scanning the original a second time by linewise, optical scanning to produce a second data signal representing grey-level values of the points along the lines of the original;

(g) comparing the grey-level values of the second data signal in one of the plurality of zones to the fixed threshold value of the zone;

(h) generating binary values in response to said comparison; and (i) generating an electric representation for the original in response to the binary values.

6. The method according to claim 5 wherein the fixed threshold value is determined by prescanning the original.

7. The method according to claim 5 further comprising the step of corresponding the zone with the fixed threshold value for that zone such that each zone represents a rectangular area on the original which is divided into line segments positioned side by side.

8. The method according to claim 5 further comprising the step of comparing the grey level values of the zone to a further threshold value for the zone when a first comparison point is positioned centrally in the zone, said further threshold value corresponding to an interpolation between the fixed threshold values of several adjacent zones when a second comparison point in each adjacent zone is positioned in the rim of the zone facing said adjacent zones.

9. A scanner system comprising:
(a) an optical line detector for linewise optical scanning of an original for generating a first data signal representing grey-level values of points along lines of the original;
(b) means for sorting the grey-level values in zones associated with locations of the grey-level values on the original;
(c) means for statistically calculating a fixed threshold value for each zone in response to a frequency of occurrence of the respective grey-level values in each zone, said calculation of the fixed threshold value starting prior to the termination of the scanning;
(d) a memory in which the fixed threshold value of each zone is stored; and
(e) a comparator for comparing the grey-level values in one of the zones with the fixed threshold value of the one zone, the comparator for generating a binary, electric representation of the original.

* * * * *

UNITED STATES PATENT AND TRADEMARK OFFICE
CERTIFICATE OF CORRECTION

PATENT NO. : 5,640,465
DATED : June 17, 1997
INVENTOR(S) : Asbjorn Smitt

It is certified that error appears in the above-identified patent and that said Letters Patent is hereby corrected as shown below:

On the Title Page

In column 1, [item 63], change "Sep. 10, 1993" to --Sep. 20, 1993-- and "835,771" to --835,774--.

In column 2, under "*Attorney, Agent*" change "Gustavo Siller, Jr.; Meredith L. Martin" to --Brinks Hofer Gilson & Lione--.

Signed and Sealed this

Fifth Day of December, 2000

*Attest:*

Q. TODD DICKINSON

*Attesting Officer*     *Director of Patents and Trademarks*